United States Patent
Song

(10) Patent No.: US 12,438,632 B2
(45) Date of Patent: Oct. 7, 2025

(54) APPLYING UPLINK CHANNEL INFORMATION TO DETERMINE DATA PROCESSING MODEL DEPLOYED FOR DOWNLINK USE

(71) Applicant: Nokia Technologies Oy, Espoo (FI)

(72) Inventor: Nuan Song, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 350 days.

(21) Appl. No.: 18/000,410

(22) PCT Filed: Jun. 8, 2020

(86) PCT No.: PCT/CN2020/094956
§ 371 (c)(1),
(2) Date: Dec. 1, 2022

(87) PCT Pub. No.: WO2021/248280
PCT Pub. Date: Dec. 16, 2021

(65) Prior Publication Data
US 2023/0239105 A1 Jul. 27, 2023

(51) Int. Cl.
*H04B 17/391* (2015.01)
*H04L 5/00* (2006.01)

(52) U.S. Cl.
CPC ......... *H04B 17/391* (2015.01); *H04L 5/0051* (2013.01); *H04L 5/0064* (2013.01)

(58) Field of Classification Search
None
See application file for complete search history.

(56) References Cited

U.S. PATENT DOCUMENTS

2019/0245602 A1 8/2019 Wang et al.
2020/0052757 A1* 2/2020 Wang .................... H04W 24/02
(Continued)

FOREIGN PATENT DOCUMENTS

CN 108141257 A 6/2018
CN 108370263 A 8/2018
(Continued)

OTHER PUBLICATIONS

Vasisht et al. Eliminating Channel Feedback in Next-Generation Cellular Networks, 2016, SIGCOMM, (Year: 2016).*
(Continued)

*Primary Examiner* — Luna Weissberger
(74) *Attorney, Agent, or Firm* — Robert P. Michal, Esq.; Carter, DeLuca & Farrell LLP

(57) ABSTRACT

Example embodiments of the present disclosure relate to applying uplink channel information to determine data processing model deployed for downlink use. According to embodiments, a solution for channel information reporting for applying uplink channel information to determine data processing model deployed for downlink use has been proposed. A data processing model is determined using uplink dataset (for example, uplink reference signal), then the data processing model is used to process downlink CSI. In this way, compared with high-resolution CSI feedback for training, it is more accurate and does not require extra CSI feedback, which significantly reduces the overhead. It also alleviates implementation efforts on the terminal device side, since no complicated CSI processing is required.

1 Claim, 12 Drawing Sheets

(56) References Cited

U.S. PATENT DOCUMENTS

| | | | |
|---|---|---|---|
| 2020/0099434 A1 | 3/2020 | Wang et al. | |
| 2020/0136700 A1 | 4/2020 | Bogale et al. | |
| 2021/0211912 A1* | 7/2021 | Zeng | H04L 5/1461 |
| 2021/0273707 A1* | 9/2021 | Yoo | H04L 1/0041 |
| 2022/0123800 A1* | 4/2022 | Li | H04L 5/0091 |

FOREIGN PATENT DOCUMENTS

| | | | |
|---|---|---|---|
| CN | 110719240 A | 1/2020 | |
| CN | 110912598 A | 3/2020 | |
| CN | 111162888 A | 5/2020 | |
| EP | 4111599 A1 | 1/2023 | |
| WO | 2019/172639 A1 | 9/2019 | |
| WO | 2019/213603 A1 | 11/2019 | |
| WO | 2020/042107 A1 | 3/2020 | |
| WO | 2021/142631 A1 | 7/2021 | |
| WO | 2021/248852 A1 | 12/2021 | |

OTHER PUBLICATIONS

He et al., "Deep learning-based channel estimation for beamspace mmWave massive MIMO systems", IEEE Wireless Communications Letters, vol. 7, No. 5, Oct. 2018, pp. 852-855.

Sun et al., "Limited feedback double directional massive mimo channel estimation: From low-rank modeling to deep learning", IEEE 19th International Workshop on Signal Processing Advances in Wireless Communications (SPAWC), Jun. 25-28, 2018, 5 pages.

Dong et al., "Deep cnn for wideband mmwave massive mimo channel estimation using frequency correlation", IEEE International Conference on Acoustics, Speech and Signal Processing (ICASSP), May 12-17, 2019, pp. 4529-4533.

Wen et al., "Deep learning for massive MIMO CSI feedback", IEEE Wireless Communications Letters, vol. 7, No. 5, Oct. 2018, pp. 748-751.

Alkhateeb et al., "Deep Learning Coordinated Beamforming for Highly-Mobile Millimeter Wave Systems", IEEE Access, vol. 6, Jun. 25, 2018, pp. 37328-37348.

Foo et al., "Uplink based downlink beamforming in UTRA FDD", Cost, vol. 273, Sep. 19-20, 2002, 13 pages.

Hugl et al., "Spatial reciprocity of uplink and downlink radio channels in FDD systems", Cost, vol. 273, No. 2, May 30-31, 2002, 7 pages.

Imtiaz et al., "On the directional reciprocity of uplink and downlink channels in frequency division duplex systems", IEEE 25th Annual International Symposium on Personal, Indoor, and Mobile Radio Communication (PIMRC), Sep. 2-5, 2014, pp. 172-176.

Vasisht et al., "Eliminating channel feedback in next-generation cellular networks," SIGCOMM '16: Proceedings of the 2016 ACM SIGCOMM Conference, Aug. 2016, pp. 398-411.

Han et al., "Efficient downlink channel reconstruction for FDD multi-antenna systems", IEEE Transactions on Wireless Communications, vol. 18, No. 6, Jun. 2019, pp. 3161-3176.

Prelcic et al., "Millimeter-wave communication with out-of-band information", IEEE Communications Magazine, vol. 55, No. 12, Dec. 13, 2017, pp. 140-146.

"Research Report on Very Large Scale Antenna Technology—Release Edition", IMT-2030 (6G) Promotion Group, Sep. 2021, 122 pages.

"IEEE 802.11", Wikipedia, Retrieved on Dec. 15, 2022, Webpage available at : https://en.wikipedia.org/wiki/IEEE_802.11.

International Search Report and Written Opinion received for corresponding Patent Cooperation Treaty Application No. PCT/CN2020/094956, dated Feb. 25, 2021, 9 pages.

Extended European Search Report received for corresponding European Patent Application No. 20940028.2, dated Feb. 19, 2024, 13 pages.

Office action received for corresponding Chinese Patent Application No. 202080104515.X, dated Dec. 19, 2024, 8 pages of office action and no page of translation available.

* cited by examiner

APPLYING UPLINK CHANNEL INFORMATION TO DETERMINE DATA PROCESSING MODEL DEPLOYED FOR DOWNLINK USE

RELATED APPLICATION

This application was originally filed as PCT Application No. PCT/CN2020/094956, filed on 8 Jun. 2020, which is incorporated herein by reference in its entirety.

FIELD

Embodiments of the present disclosure generally relate to the field of telecommunication and in particular, to methods, devices, apparatuses and computer readable storage medium for applying uplink channel information to determine a data processing model deployed for downlink use.

BACKGROUND

In wireless communications, channel information (for example, channel state information (CSI)) refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multiantenna systems. Therefore, how to obtain the CSI is very important for communication performance.

SUMMARY

In general, example embodiments of the present disclosure provide a solution for applying uplink channel information to determine a data processing model deployed for downlink use.

In a first aspect, there is provided a first device. The first device comprises at least one processor; and at least one memory including computer program codes; the at least one memory and the computer program codes are configured to, with the at least one processor, cause the first device to receive, from a second device, a reference signal on an uplink channel. The first device is also caused to determine first channel information on the uplink channel based at least in part on the received reference signal. The first device is further caused to extract second channel information on the uplink channel from the first channel information, the second channel information being generated based on the first channel information. The first device is yet caused to train, based on the first channel information and the second channel information, a data processing model to be used for recovering channel information on a downlink channel between the first device and the second device.

In a second aspect, there is provided a second device. The second device comprises at least one processor; and at least one memory including computer program codes; the at least one memory and the computer program codes are configured to, with the at least one processor, cause the second device to transmit to a first device a reference signal on an uplink channel, the reference signal for determining first channel information on the uplink channel, and the first channel information being for determining a data processing model to be for recovering channel information on a downlink channel between the first device and the second device.

In a third aspect, there is provided a method. The method comprises receiving, at a first device and from a second device, a reference signal on an uplink channel. The method also comprises determining first channel information on the uplink channel based at least in part on the received reference signal. The method further comprises extracting second channel information on the uplink channel from the first channel information, the second channel information being generated based on the first channel information. The method yet comprises training, based on the first channel information and the second channel information, a data processing model to be used for recovering channel information on a downlink channel between the first device and the second device.

In a fourth aspect, there is provided a method. The method comprises transmitting, at a second device and to a first device, a reference signal on an uplink channel, the reference signal for determining first channel information on the uplink channel, and the first channel information being for determining a data processing model to be for recovering channel information on a downlink channel between the first device and the second device.

In a fifth aspect, there is provided an apparatus. The apparatus comprises means for receiving, at a first device and from a second device, a reference signal on an uplink channel; means for determining first channel information on the uplink channel based at least in part on the received reference signal; means for extracting second channel information on the uplink channel from the first channel information, the second channel information being generated based on the first channel information; and means for training, based on the first channel information and the second channel information, a data processing model to be used for recovering channel information on a downlink channel between the first device and the second device.

In a sixth aspect, there is provided an apparatus. The apparatus comprises means for transmitting, at a second device and to a first device, a reference signal on an uplink channel, the reference signal for determining first channel information on the uplink channel, and the first channel information being for determining a data processing model to be for recovering channel information on a downlink channel between the first device and the second device.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
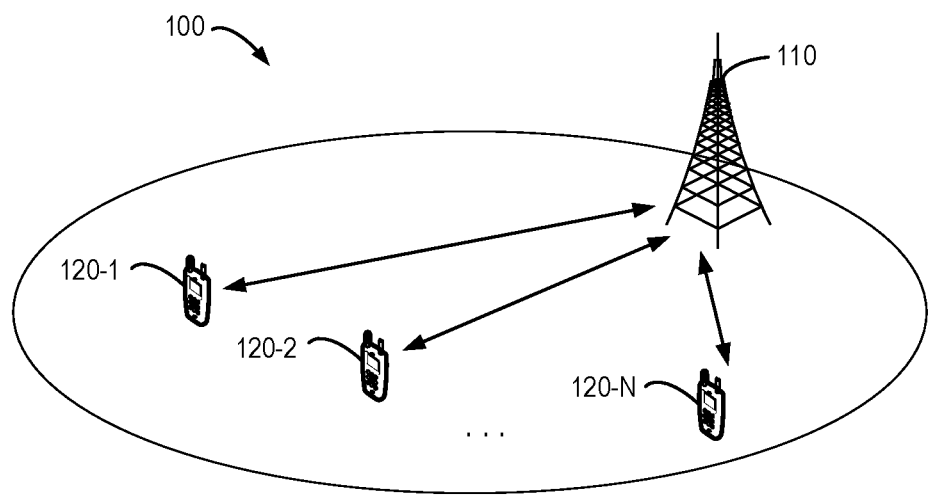
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, how to obtain the CSI is very important for communication performance. The Machine Learning (ML) based Multiple Input and Multiple Output (MIMO) attracts significant attentions and shows its advantages especially in the physical layer solutions such as beamforming and Channel State Information (CSI) acquisition. The ML based massive MIMO schemes can provide a performance enhancement and reduce the computational complexity, overhead, as well as latency.

A lot of ML schemes on CSI acquisition (for example, including channel estimation, feedback and the like) and beamforming may train the Neural Network (NN) offline using statistical channel models, ray-tracing generated data, or measurement data, for analysis purpose. Since the dataset used in the pre-training cannot totally represent the real environment, when such an NN is deployed in practice, it requires a further training to update the weights of the pre-trained NN. In some other cases, it might be also possible to directly train the NN in the deployed real scenario. For example, in the CSI feedback and channel estimation applications, training of the NN requires paired dataset (for example, the true or "reference" CSI and the compressed CSI), however, it is extremely difficult to obtain the true CSI in practice. Some conventional technologies only assume that the exact CSI can be obtained to train or update the NN in the deployment.

One conventional solution is to apply high-resolution CSI feedback to train the NN in the real deployment. However, the data collection leads to a very large overhead. Even though it is high-resolution, it is still far from the exact value, since the UE needs to quantize the estimated CSI. Such CSI quantization with a high resolution considered as the reference CSI would also degrade the performance of the NN.

In TDD system, due to the reciprocity, it is straightforward to use uplink CSI to train the NN which is used for downlink. However, in FDD system when reciprocity does not hold, such a concept cannot be applied.

According to embodiments, a solution for channel information reporting for applying uplink channel information to determine data processing model deployed for downlink use has been proposed. A data processing model is determined using uplink dataset (for example, uplink reference signal), then the data processing model is used to process downlink CSI. In this way, compared with high-resolution CSI feedback for training, it is more accurate and does not require extra CSI feedback, which significantly reduces the overhead. It also alleviates implementation efforts on the terminal device side, since no complicated CSI processing is required.

FIG. 1 illustrates a schematic diagram of a communication environment 100 in which embodiments of the present disclosure can be implemented. The communication environment 100 comprises a first device 110. The communication environment 100, which is a part of a communication network, further comprises a device 120-1, a device 120-2, . . . , a device 120-N, which can be collectively referred to as "second device(s) 120." The first device 110 and the second device 120 can communicate with each other.

The communication environment 100 may comprise any suitable number of devices and cells. In the communication environment 100, the first device 110 and the second device 120 can communicate data and control information to each other. In the case that the first device 110 is the network device and the second device 120 is the terminal device, a link from the second device 120 to the first device 110 is referred to as an uplink (UL), while a link from the first device 110 to the second device 120 is referred to as a downlink (DL). The second device 120 and the first device 110 are interchangeable.

It is to be understood that the number of first devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
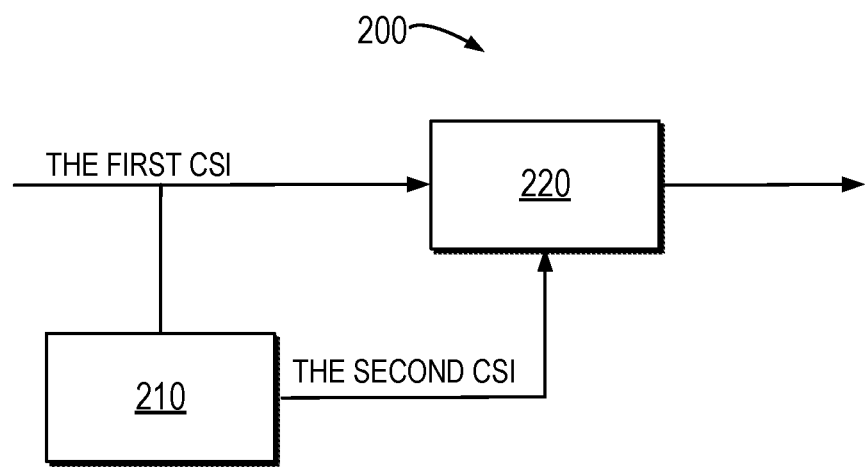
FIG. 2 illustrates a simplified block diagram of training model according to some example embodiments of the present disclosure.

FIG. 2 illustrates a simplified block diagram of an apparatus 200 for training model according to some example embodiments of the present disclosure. The apparatus 200 can be implemented at the first device 110. Alternatively, the apparatus 200 may be implemented at the second device 120. It should be noted that embodiments of the present disclosure are not limited to this aspect.

The apparatus 200 may comprise a module 210 which can be used for compressing the first CSI to obtain the second CSI. The second CSI may have less information than the first CSI. The apparatus may also comprise a module 220 which can be used for training the data processing model based on the first CSI and the second CSI. In this way, the downlink CIS can be obtained more accurate by using the data processing model. Further, it does not require extra CSI feedback, which significantly reduces the overhead. It also alleviates implementation efforts on the terminal device side, since no complicated CSI processing is required.

Figure 3:
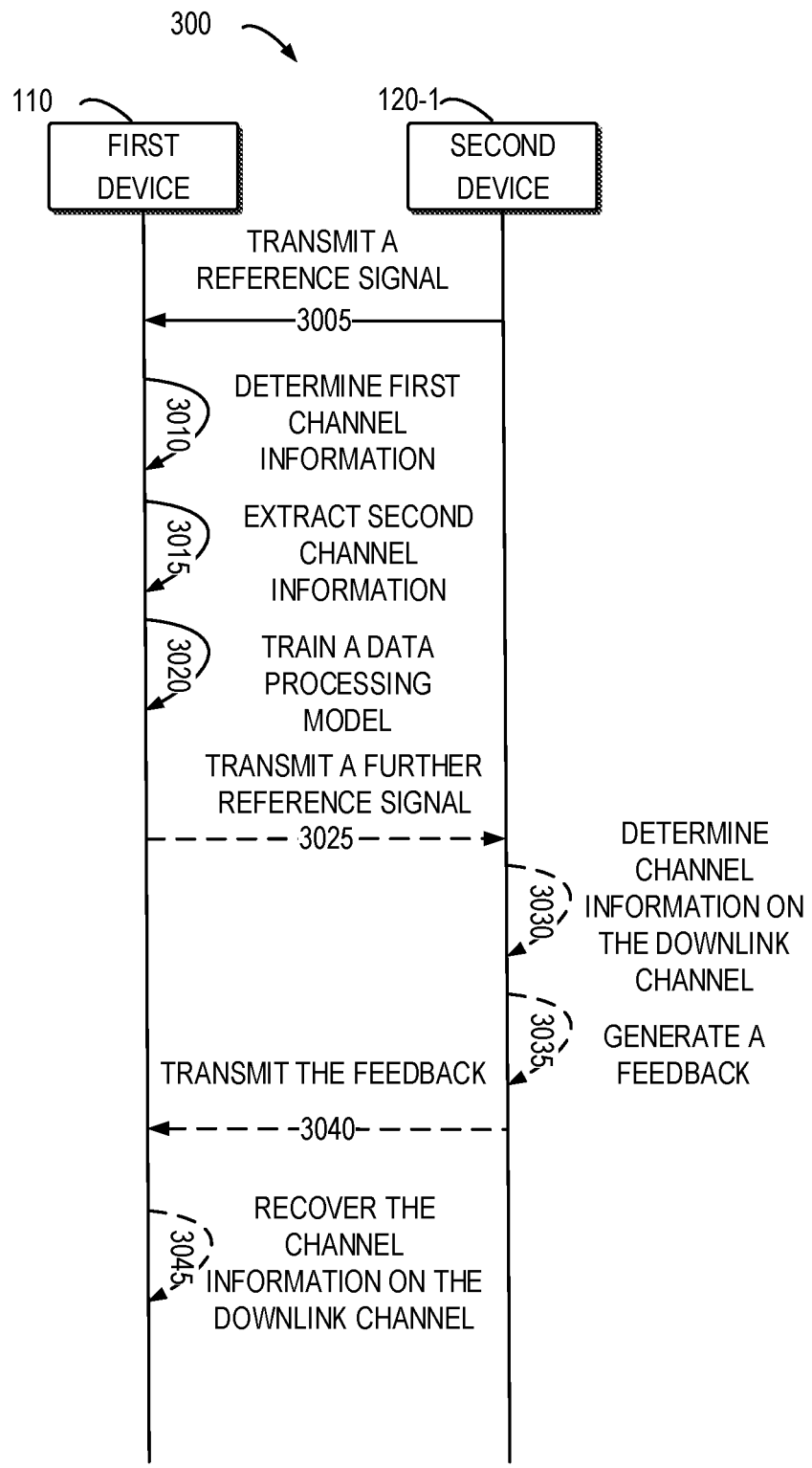
FIG. 3 illustrates a signaling flow for applying uplink channel information to determine data processing model deployed for downlink use according to some example embodiments of the present disclosure.

Example embodiments of the present disclosure will be described in detail below with reference to the accompanying drawings. Reference is now made to FIG. 3, which illustrates a signaling flow 300 for training a downlink data processing model with uplink channel information according to example embodiments of the present disclosure. For the purpose of discussion, the signaling flow 300 will be described with reference to FIG. 1. The signaling flow 300 may involve the first device 110 and the second device 120-1.

For the purpose of illustration, by way of example, a clustered model may be applied to characterize the channel between the first device 110 and the second device 120-1, which is written as $$H = \sqrt{\frac{M_T M_R}{N_c N_p}} \sum_{i=1}^{N_c} \sum_{l=1}^{N_p} \alpha_{il} a_R(\phi_{il}) a_T^H(\theta_{il}) \quad (1)$$

where $\alpha_{il}$ is the complex channel gain of the i-th cluster and 1-th path and follows the complex normal distribution CN(0,1). The number of clusters is denoted by $N_C$ and the number of rays/paths within one cluster is $N_P$. The Angles of Arrival/Departure (AoAs/AoDs) Pit $\phi_{il}$, $\theta_{il}$ are uniformly distributed within [0,2π]. $\alpha_R(\phi_{il})$ and $\alpha_T(\theta_{il})$ are array response vectors of the second device 120-1 and the first device 110 at angles of $\phi_{il}$, $\theta_{il}$, respectively.

The second device 120-1 transmits 3005 a reference signal on an uplink channel to the first device 110. The reference signal may be any suitable signals which can be used for channel estimation. For example, the reference signal may be a sounding reference signal (SRS). Alternatively, a demodulation reference signal may be used.

In some example embodiment, the second device 10-1 may compensate the reference signal before transmission. For example, the compensation parameter may be determined based on a frequency of the uplink channel (referred to as "first frequency" hereinafter) and a frequency of the downlink channel (referred to as "second frequency" hereinafter). The second device 120-1 may apply the compensation parameter to the reference signal. For example, the phase of the reference signal can be compensated based on the compensation parameter. From antenna point of view: the antenna array response depends on the carrier frequency. Take an example of a Uniform Linear Array (ULA) with N antenna elements, whose array response with impinging angle θ can be written in a general form as $$a(\theta) = \begin{bmatrix} 1 \\ e^{-j2\pi\frac{d}{c}f_c sin(\theta)} \\ \vdots \\ e^{-j2\pi(N-1)\frac{d}{c}f_c sin(\theta)} \end{bmatrix} \in C^N \quad (2)$$

where $f_c$ is the carrier frequency, c is the speed of the light, d denotes the distance between two adjacent antenna elements (assumed the same for both uplink and downlink), $C^N$ represents that the dimension of the matrix is N*1. If the relationship between the first frequency ($f_{UL}$) and the second frequency ($f_{DL}$) is represented as $f_{DL}=f_{UL}+\Delta_f$, $\Delta_f$ is called the uplink/downlink frequency duplex distance. Therefore, the antenna responses for the n-th element in uplink and downlink can be obtained by:

$$a_{UL}^{(n)}(\theta) = e^{-j2\pi(n-1)\frac{d}{c}f_{UL}sin(\theta)} \quad (3)$$

$$a_{DL}^{(n)}(\theta) = e^{-j2\pi(n-1)\frac{d}{c}(f_{UL}+\Delta f)sin(\theta)} \quad (4)$$

where $f_c$ is the carrier frequency, c is the speed of the light, and d denotes the distance between two adjacent antenna elements (assumed the same for both uplink and downlink).

It can be seen that the antenna array difference between uplink and downlink lies in a term $e^{-j2\pi(n-1)d/c\Delta f sin(\theta)}$. Therefore, from the antenna response point of view, there is difference between uplink and downlink due to the frequency duplex distance. In order to use the uplink data to train the downlink data processing model, a compensation of the antenna array manifold is needed.

For the purpose of illustrations, the channel model can be simplified into cluster based model as $$H = \sqrt{\frac{M_T M_R}{\rho}} \sum_{i=1}^{N_c} \gamma_i a_R(\phi_i) a_T^H(\theta_i) \quad (5)$$

where ρ is the normalization factor. This expression can be formulated using matrices $$H=A_R \text{ diag}(\gamma) A_T^H \quad (6)$$

where $\gamma=M_T M_R/\beta[\gamma_1, \ldots, \gamma_{N_c}] \in C^{N_c \times N_c}$ is the vector denoting the composite gain of clusters, and $A_R=[\alpha_R(\phi_1), \ldots, \alpha_R(\phi N_C)] \in C^{M_R \times N_C}$ and $A_T=[\alpha_T(\theta_1), \ldots, \alpha_T(\theta N_c)] \in C^{M_T \times N_C}$ are the concatenations of array response vectors from all clusters for the second device 120-1 and the first device 110, respectively.

From formulas (3) and (4), the compensation matrix of the downlink array response vector of dimension N using the uplink counterpart can be generally expressed as:

$$P = \begin{bmatrix} 1 & & & \\ & e^{-j2\pi\frac{d}{c}\Delta f sin(\theta)} & & \\ & & \ddots & \\ & & & e^{-j2\pi(N-1)\frac{d}{c}\Delta f sin(\theta)} \end{bmatrix} \in C^{N \times N} \quad (7)$$

where $f_c$ is the carrier frequency, c is the speed of the light, and d denotes the distance between two adjacent antenna elements (assumed the same for both uplink and downlink), the dimension of this matrix is N*N.

Therefore, the transformation from the uplink to downlink can be obtained by $$A_{DL}=PA_{UL} \quad (8)$$

where $A_{DL}$ represents response vectors on the downlink channel, the $A_{UL}$ represents response vectors on the uplink channel and P represents the compensation matrix of the downlink array response vector.

By way of example, the reference signal to be transmitted at the second device 120-1 can be represented as s. Thus, the compensated reference signal can be represented as $P_R^H s$, where the transmit compensation matrix at the second device 120-1 is $P_R \in C^{M_R \times M_R}$ which can be obtained by the formula 7.

In some example embodiments, the first device 110 may also compensate the received reference signal. For example, the compensation parameter may be determined based on the first frequency and the second frequency and may be applied to the received reference signal. The first device 110 may compensate a phase of the received reference signal based on the compensation parameter. In some example embodiments, the received reference signal can be represented as:

$$\bar{y} = H_{UL} P_R^H s + n \varepsilon C^{M_T} \quad (9)$$

where s represents the original reference signal, $H_{UL} = A_{T,UL} \text{diag}(\gamma) A_{R,UL}^H$ is the uplink CSI and n is the additive white Gaussian noise. The transmit compensation at the second device 120-1 is achieved by $A_{R,DL} = P_R A_{R,UL}$ according to the formula (8).

In some example embodiments, the compensated received reference signal can be represented as:

$$y = P_T \bar{y} = P_T H_{UL} P_R^H s + P_T n \varepsilon C^{M_T} \quad (10)$$

where $P_T \in C^{M_T \times M_Y}$ refers to the receive compensation matrix at the first device 110, which is achieved by $A_{T,DL} = P_T A_{T,UL}$ according to the formula (9), s represents the original reference signal, $H_{UL} = A_{T,UL} \text{diag}(\gamma) A_{R,UL}^H$ is the uplink CSI, n is the additive white Gaussian noise and J represents the received reference signal.

The first device 110 determines 3010 first channel information based on the reference signal on the uplink channel. For example, the first device 110 may determine the original reference signal (for example, represented as "s" in formula (9)) which is transmitted by the second device 120-1. Since the uplink channel between the first device 110 and the second device 120-1 is not an ideal channel, the reference signal transmitted at the second device 120-1 and the reference signal received at the first device 110 may not be the same. The original reference signal refers to the reference signal without any attenuation, interferences or noise. In some example embodiments, the original reference signal may be predetermined so that the first device 110 is able to obtain the original reference signal. In some example embodiments, the first channel information may be represented as:

$$\bar{H}_{UL} = P_T H_{UL} P_R^H = P_T A_{T,UL} \, \text{diag}(\gamma)(P_R A_{R,UL})^H =$$
$$A_{T,DL} \, \text{diag}(\gamma) A_{R,DL}^H \quad (11)$$

where $P_T \in C^{M_T \times M_T}$ refers to the receive compensation matrix at the first device 110, which is achieved by $A_{T,DL} = P_T A_{T,UL}$ according to the formula (9), and $H_{UL} = A_{T,UL} \text{diag}(\gamma) A_{R,UL}^H$ is the uplink CSI.

Alternatively, the first device 110 may monitor the uplink channel to receive the reference signal during a predetermined period. The first device 110 may receive any suitable number of reference signals. The first channel information may be determined based on the reference signals received during the predetermined period. For example, the first device 110 may receive one or more reference signals for a predetermined duration. Alternatively, if the number of data bursts received by the first device 110 is below a threshold number, the first device 110 may continue monitoring the uplink channel and receiving the reference signal(s).

The first device 110 extracts 3015 second channel information from the first channel information. The second channel information is generated based on the first channel information. The second channel information may have less information than the first channel information. In some example embodiments, the second channel information can be generated by compressing the first channel information. Alternatively or in addition, the first channel information can be quantized to obtain the second channel information. In other embodiments, the second channel information may be codebook based information. The second channel information may be able to represent the first channel information but more concise than the first channel information. It should be noted that the second channel information can be obtained by using any suitable processing. Embodiments of the present disclosure are not limited to this aspect. In some example embodiments, the second channel information can be obtained in a similar way as the UE generating processed UL-CSI. For example, the first device 110 and the second device 120-1 may utilize the same processing to obtain the second channel information and the processed UL-CSI, respectively.

The first device 110 trains 3020 a data processing model based on the first channel information and the second channel information. In some example embodiments, the second channel information can be recovered using the data processing model. The first device 110 may compare the recovered second channel information with the first channel information. The first device 110 may update the data processing model based on the comparison. If the difference exceeds the threshold value, it means that the recovered second channel information does not comprise enough channel information. The first device 110 may continue training the data processing model. Alternatively, if the difference between the recovered second channel information and the first channel information is below a threshold value, parameters of the current data processing model can be used for the downlink. The first device 110 may stop training the data processing model.

Figure 4:
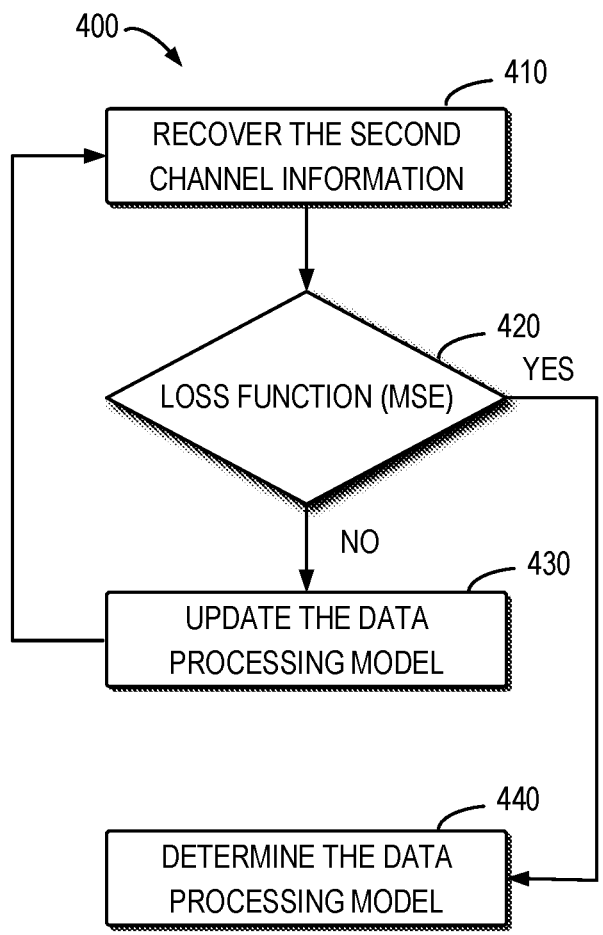
FIG. 4 illustrates a flowchart of a method implemented at a first apparatus according to some example embodiments of the present disclosure.

FIG. 4 shows a flowchart of an example method 400 for training the data processing model. The first device 110 may use the first channel information and the second channel information to train the data processing model. It should be noted that the method 400 is only an example not limitations. The data processing model can be determined in any suitable ways.

At block 410, the first device 110 may recover the second channel information using the data processing model. At block 420, the first device 110 may apply loss function to train the data processing model. In some example embodiments, the loss function may be Mean Squared Error (MSE) of the channel estimation. For example, the MSE can be represented as:

$$\text{Loss}(\Theta) = \frac{1}{N_d} \sum_{i=1}^{N_d} \|\hat{H}_{UL,i} - \tilde{H}_{UL,i}\|_F^2 \triangleq \frac{1}{N_d} \sum_{i=1}^{N_d} \|\mathcal{F}(\tilde{H}_{UL,i}, \Theta) - \tilde{H}_{UL,i}\|_F^2, \quad (12)$$

where the mapping function of the data processing model is denoted by $\mathcal{F}$, $\Theta$ represents the parameters to be adjusted in the data processing model $\mathcal{F}$, $N_d$ is the number of training samples, i represents the i-th training sample, $\bar{H}_{UL}$ represents the first channel information and $\tilde{H}_{UL}$ represents the second channel information. When the training is completed, the parameters Θ of the data processing model can be obtained.

Since the first channel information is able to represent the distribution of exact downlink channel information ($H_{DL}$), the trained data processing model can be directly applied to the CSI acquisition procedure. Therefore, in the estimation phase, the input to the trained data processing model is the CSI feedback $\overline{H}_{DL}$ and data processing model is able to recover the downlink CSI $\hat{H}_{DL}$.

According to embodiments of the present disclosure, the data processing model is trained with the uplink channel information and can be applied to recover the downlink channel information. Compared with conventional technologies, it is more accurate. It does not require extra CSI feedback, thereby significantly reducing overheads.

Referring back to FIG. 3, the first device 110 may transmit 3025 a further reference signal on a downlink channel to the second device 120-1. For example, the further reference signal may be CSI reference signal. Alternatively, demodulation reference signal can be transmitted.

The second device 120-1 may determine 3030 channel information on the downlink channel based on the further reference signal. For example, the second device 120-1 may estimate the channel information on the downlink channel. The second device 120 may further extract the channel information on the downlink channel. By way of example, the channel information can be compressed. Alternatively, the second device 120-1 may quantize the channel information on the downlink channel.

The second device 120-1 may generate 3035 a feedback to the further reference signal. The feedback may comprise the extracted channel information on the downlink channel. The second device 120-1 may transmit 3040 the feedback to the first device 110.

The first device 110 may recover 3045 the channel information on the downlink channel from the feedback using the trained data processing model. In this way, the downlink channel information can be recovered without extra overheads.

In some example embodiments, the first device 110 may monitor whether the data processing model is suitable. For example, the second device 120-1 may transmit uplink CSI and the first device 110 may recover the uplink CSI using the data processing model. The first device 110 may compare the recovered uplink CSI with the exact uplink CSI. If the comparison shows that the recovered uplink CSI comprise most information in the exact uplink CSI, the data processing model is still applicable. If the recovered uplink CSI is not satisfied, the data processing model needs to be retrained.

Figure 5:
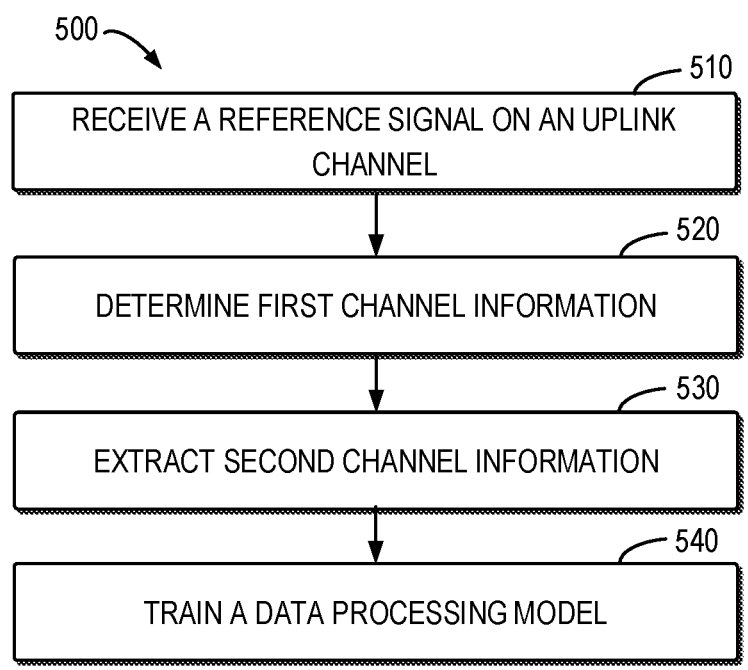
FIG. 5 illustrates a flowchart of a method implemented at a first apparatus according to some example embodiments of the present disclosure.

FIG. 5 shows a flowchart of an example method 500 implemented at a first device 110 in accordance with some example embodiments of the present disclosure. For the purpose of discussion, the method 500 will be described from the perspective of the first device 110.

At block 510, the first device 110 receives a reference signal on an uplink channel from the second device 120. The reference signal may be any suitable signals which can be used for channel estimation. For example, the reference signal may be a SRS. Alternatively, a demodulation reference signal may be used.

In some example embodiments, the first device 110 may also compensate the received reference signal. For example, the compensation parameter may be determined based on the first frequency and the second frequency.

At block 520, the first device 110 determines first channel information based on the reference signal on the uplink channel. Alternatively, the first device 110 may monitor the uplink channel to receive the reference signal during a predetermined period. The first device 110 may receive any suitable number of reference signals. The first channel information may be determined based on the reference signals received during the predetermined period. For example, the first device 110 may receive one or more reference signals for a predetermined duration. Alternatively, if the number of data bursts received by the first device 110 is below a threshold number, the first device 110 may continue monitoring the uplink channel and receiving the reference signal(s).

At block 530, the first device 110 extracts second channel information from the first channel information. The second channel information is generated based on the first channel information. In some example embodiments, the second channel information can be obtained by compressing the first channel information. Alternatively, the first channel information can be quantized to obtain the second channel information. The second information may have less information than the first channel information. In some example embodiments, the second channel information can be obtained in a similar way as the UE generating processed UL-CSI.

At block 540, the first device 110 trains a data processing model based on the first channel information and the second channel information. In some example embodiments, the second channel information can be recovered using the data processing model. The first device 110 may compare the recovered second channel information with the first channel information. The first device 110 may update the data processing model based on the comparison. If the difference exceeds the threshold value, it means that the recovered second channel information does not comprise enough channel information. The first device 110 may continue training the data processing model. Alternatively, if the difference between the recovered second channel information and the first channel information is below a threshold value, parameters of the current data processing model can be used for the downlink. The first device 110 may stop training the data processing model.

In some example embodiments, the first device 110 may transmit a further reference signal on a downlink channel to the second device 120-1. For example, the further reference signal may be CSI reference signal. Alternatively, demodulation reference signal can be transmitted. The first device 110 may receive the feedback from the second device 120-2 which comprises the extracted channel information on the downlink channel. The first device 110 may recover the channel information on the downlink channel from the feedback using the trained data processing model. In this way, the downlink channel information can be recovered without extra overheads.

In some example embodiments, the first device 110 may monitor whether the data processing model is suitable. For example, the second device 120-1 may transmit uplink CSI and the first device 110 may recover the uplink CSI using the data processing model. The first device 110 may compare the recovered uplink CSI with the exact uplink CSI. If the comparison shows that the recovered uplink CSI comprise most information in the exact uplink CSI, the data processing model is still applicable. If the recovered uplink CSI is not satisfied, the data processing model needs to be retrained.

Figure 6:
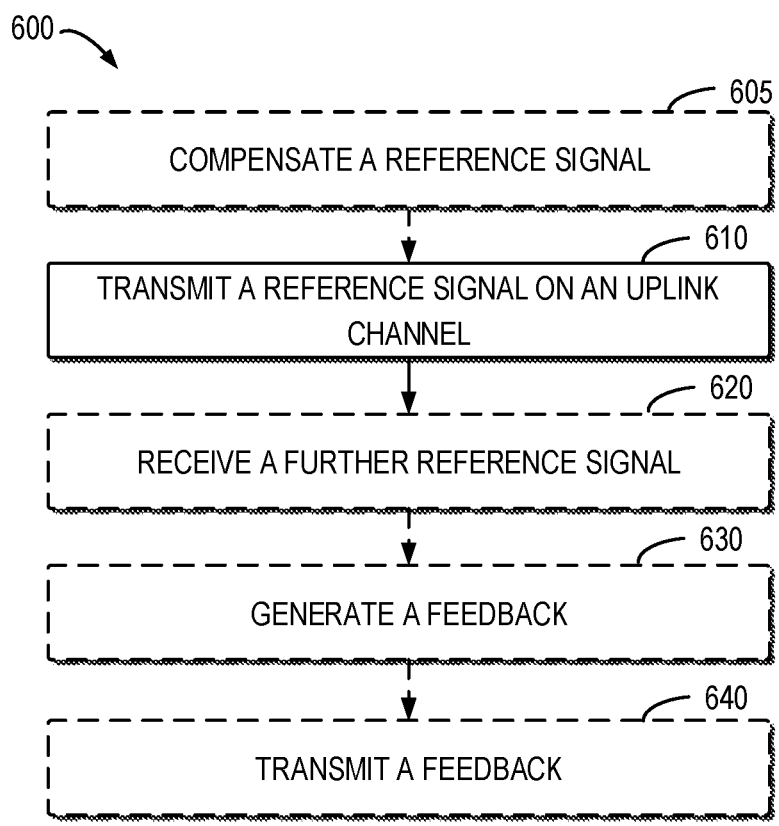
FIG. 6 illustrates a flowchart of a method implemented at a second apparatus according to some other example embodiments of the present disclosure.

FIG. 6 shows a flowchart of an example method 600 implemented at a second device 120 in accordance with some example embodiments of the present disclosure. For the purpose of discussion, the method 600 will be described from the perspective of the second device 120. It should be noted that the dashed blocks are optional.

Optionally, in an example embodiment, at block 605, the second device 10-1 may compensate the reference signal before transmission. For example, the compensation parameter may be determined based on the first frequency and the second frequency.

At block 610, the second device 120-1 transmits a reference signal on an uplink channel to the first device 110. The reference signal may be any suitable signals which can be used for channel estimation. For example, the reference signal may be a sounding reference signal (SRS). Alternatively, a demodulation reference signal may be used.

In some example embodiments, at block 620, the second device 120-1 may receive a further reference signal on a downlink channel from the first device 110. For example, the further reference signal may be CSI reference signal. Alternatively, demodulation reference signal can be transmitted. The second device 120-1 may generate, at block 630, a feedback to the further reference signal. The feedback may comprise the extracted channel information on the downlink channel. In some example embodiment, at block 640, the second device 120-1 may transmit the feedback to the first device 110.

In some example embodiments, a first apparatus capable of performing any of the method 500 (for example, the first device 110) may comprise means for performing the respective operations of the method 500. The means may be implemented in any suitable form. For example, the means may be implemented in a circuitry or software module. The first apparatus may be implemented as or included in the first device 110. In some example embodiments, the means may comprise at least one processor and at least one memory including computer program code. The at least one memory and computer program code are configured to, with the at least one processor, cause performance of the apparatus.

In some example embodiments, the apparatus comprises means for receiving, at a first device and from a second device, a reference signal on an uplink channel; means for determining first channel information on the uplink channel based at least in part on the received reference signal; means for extracting second channel information on the uplink channel from the first channel information, the second channel information being generated based on the first channel information; and means for training, based on the first channel information and the second channel information, a data processing model to be used for recovering channel information on a downlink channel between the first device and the second device.

In some example embodiments, the means for training the data processing model comprises: mean for iteratively performing the following: recovering the second channel information using the data processing model; comparing the recovered second channel information with the first channel information; and updating the data processing model based on the comparison, until a difference between the recovered second channel information and the first channel information being less than a threshold value.

In some example embodiments, the apparatus further comprises means for determining a compensation parameter based on a first frequency of the uplink channel and a second frequency of the downlink channel; and means for compensating a phase of the received reference signal based on the compensation parameter.

In some example embodiments, the means for determining the first uplink channel information: means for determining an original reference signal transmitted by the second device; and means for determining the first channel information based on the original reference signal and the received reference signal.

In some example embodiments, the apparatus further comprises means for transmitting a further reference signal on the downlink channel to the second device; means for receiving from the second device a feedback to the further reference signal, the feedback comprising extracted channel information on the downlink channel; and means for recovering the channel information on the downlink channel from the feedback using the data processing model.

In some example embodiments, the means for receiving the reference signal comprises means for monitoring the uplink channel for receiving the reference signal during a predetermined period.

In some example embodiments, the first device comprises a network device and the second device comprises a terminal device.

In some example embodiments, a second first apparatus capable of performing any of the method 600 (for example, the second device 120) may comprise means for performing the respective operations of the method 600. The means may be implemented in any suitable form. For example, the means may be implemented in a circuitry or software module. The first apparatus may be implemented as or included in the second device 120. In some example embodiments, the means may comprise at least one processor and at least one memory including computer program code. The at least one memory and computer program code are configured to, with the at least one processor, cause performance of the apparatus.

In some example embodiments, the apparatus comprises means for transmitting, at a second device and to a first device, a reference signal on an uplink channel, the reference signal for determining first channel information on the uplink channel, and the first channel information being for determining a data processing model to be for recovering channel information on a downlink channel between the first device and the second device.

In some example embodiments, the means for transmitting the reference signal comprises: means for determining a compensation parameter based on a first frequency of the uplink channel and a second frequency of the downlink channel; and means for compensating a phase of the reference signal based on the compensation parameter.

In some example embodiments, the apparatus further comprises means for receiving from the first device a further reference signal on the downlink channel; means for determining the channel information on the downlink channel based on the further reference signal; means for generating a feedback to the further reference signal, the feedback comprising extracted channel information on the downlink channel; and means for transmitting the feedback to the first device.

In some example embodiments, the first device comprises a network device and the second device comprises a terminal device.

Figure 7:
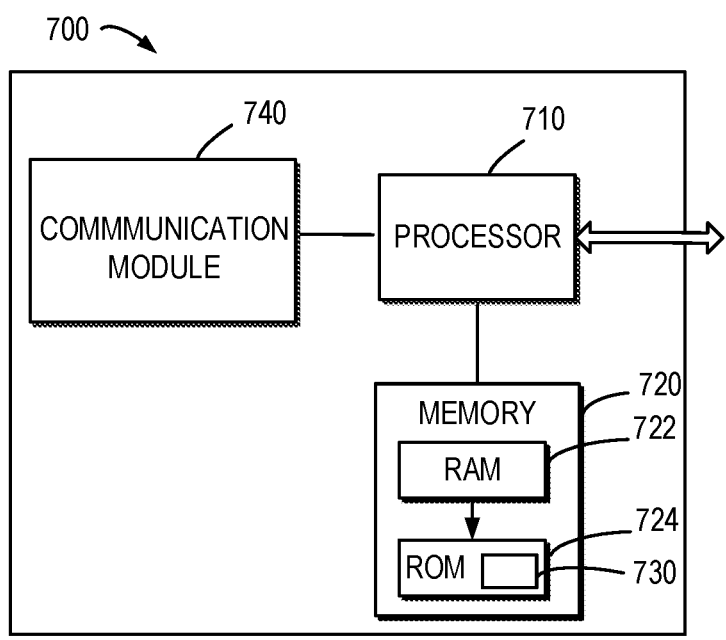
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the first device 110 or the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

Example embodiments of the present disclosure may be implemented by means of the program 730 so that the device 700 may perform any process of the disclosure as discussed with reference to FIGS. 3 to 6. The example embodiments of the present disclosure may also be implemented by hardware or by a combination of software and hardware.

Figure 8:
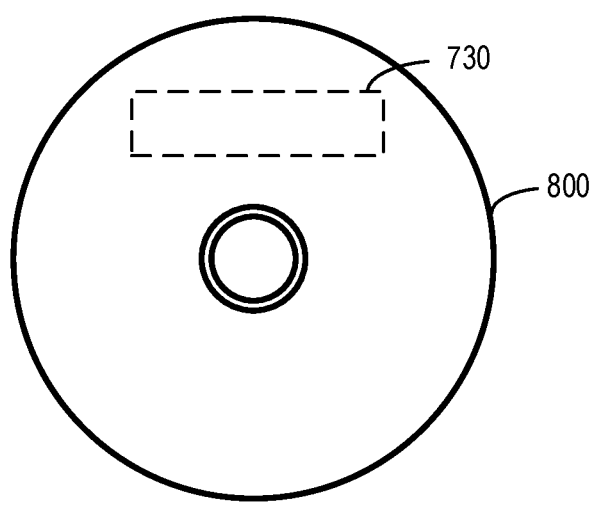
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 600 may load the program 730 from the computer readable medium to the RAM 722 for execution. The computer readable medium may include any types of tangible non-volatile storage, such as ROM, EPROM, a flash memory, a hard disk, CD, DVD, and other magnetic storage and/or optical storage. FIG. 8 shows an example of the computer readable medium 800 in form of an optical storage disk. The computer readable medium has the program 730 stored thereon.

FIGS. 9A-9D illustrate graphs of simulation results according to some example embodiments of the present disclosure. The simulation setup is shown in Table 1. The uplink and downlink channels are generated at frequencies 1.95 GHz and 2.14 GHz with a duplex distance 190 MHz. The same number of clusters Ne are used for uplink/downlink and the angles are independently generated, whose distributions are the same. The antenna arrays at both the first device 110 and second device 120-1 appear different for both frequencies.

TABLE 1

| Simulation Parameters (Single-cell) | |
|---|---|
| Channel model | Clustered channel model |
| # of clusters & rays/Cluster | 2 & 1 |
| Channel gain | Complex Normal distribution |
| Azimuth & Elevation angles | Uniform distribution |
| Carrier frequency | 2.1 GHz |
| Frequency duplex distance | 190 MHz |
| Array at the first device | $M_T$ (ULA) |
| Array at the second device | $M_r$ (ULA) |
| Number of the second devices | 2 |
| Number of transmission streams | 1 |

Embodiments of the present disclosure can be applied to the channel estimation problem, where the data processing model at the first device 110 is carried out to recover the CSI from the imperfect CSI feedback and the imperfect CSI feedback is simply the noisy CSI.

Three schemes are evaluated, where "True Training" corresponds to the case when the downlink CSI is used to train the data processing model used for downlink, "cUL Training" is related to embodiments of the present disclosure, and "UL training" refers to the case of using uplink CSI to train the DD for downlink but without compensation.

Figure 9A:
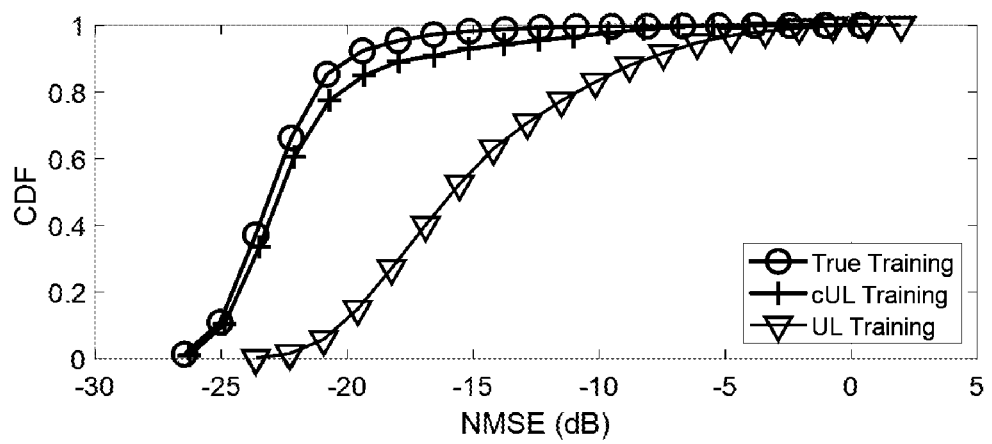
FIGS. 9A-9D illustrate graphs of simulation results according to some example embodiments of the present disclosure.
Figure 9B:
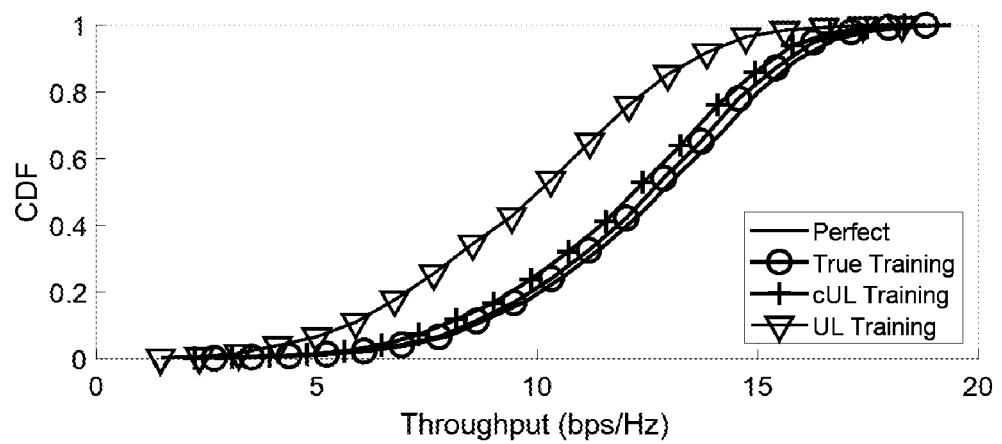

For simplicity, it considers $M_T=8$ and $M_r=2$. The Normalized Mean Square Error (NMSE) performance is shown in FIG. 9A. It can be observed that it is feasible to apply the uplink CSI to train the data processing model used for downlink processing, but compensation should be carried out to improve the accuracy. Similar results can be seen in FIG. 9B, where the Cumulative Distribution Function (CDF) of the throughput performance is plotted. The throughput performance for the case under perfect channel condition (named "Perfect") is also included.

Figure 9C:
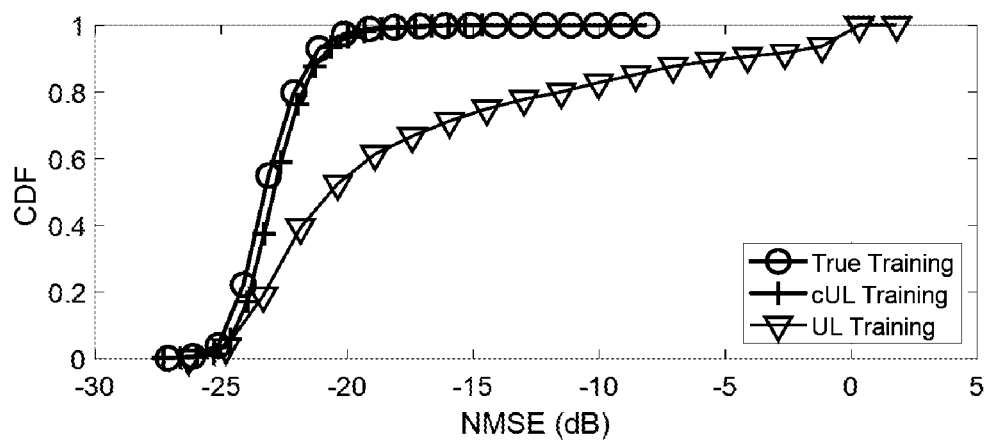
Figure 9D:
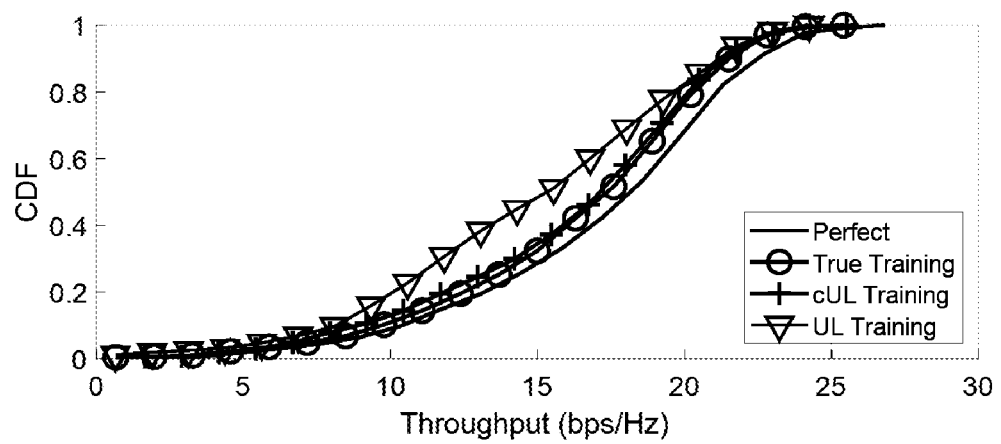

Embodiments of the present disclosure can be applied to the channel recovery problem. For simplicity, it considers $M_T=32$ and $M_r=4$. The compressed CSI has a resulting compression value of 16 (out of $M_T \cdot M_r=128$). The first device 110 should recover the CSI from compressed CSI feedback. Simulation results are shown in FIG. 9C which shows NMSE performances and in FIG. 9D which shows throughout performances.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory storing instructions that, when executed by the at least one processor, cause the first device at least to:
receive from a second device a reference signal on an uplink channel, wherein the second device comprises a terminal device, and wherein the first device is caused to receive the reference signal by monitoring the uplink channel for receiving the reference signal during a predetermined period;
determine first channel information on the uplink channel based at least in part on the received reference signal, wherein the first device comprises a network device, and wherein the first device is caused to determine the first uplink channel information by:
determining an original reference signal transmitted by the second device; and
determining the first uplink channel information based on the original reference signal and the received reference signal;
extract second channel information on the uplink channel from the first channel information, the second channel information being generated based on the first channel information, wherein the first device is caused to extract the second channel information by compressing the first channel information to obtain the second channel information, wherein the second channel information has less information than the first channel information, and wherein the first channel information is quantized to obtain the second channel information;
train, based on the first channel information and the second channel information, a data processing model to be used for recovering channel information on a downlink channel between the first device and the second device, wherein the model includes a clustered model which is written as $$H = \sqrt{\frac{M_T M_R}{N_c N_p}} \sum_{i=1}^{N_c} \sum_{l=1}^{N_p} \alpha_{il} a_R(\varphi_{il}) a_T^H(\vartheta_{il})$$

where $M_T$ is an array at the first device, $M_R$ is an array at the second device, $N_c$ denotes a number of clusters, $N_p$ denotes a number of rays and/or paths within one cluster, $\alpha_{il}$ denotes a complex channel gain of an i-th cluster and an l-th path and follows a complex normal distribution CN(0,1), φil and θil are uniformly distributed within [0, 2π] and denote an angle of arrival and an angle of departure, respectively, and $a_R(\phi_{il})$ and $a_T(\theta_{il})$ are array response vectors of the second device and the first device at angles of $\phi_{il}$, $\theta_{il}$, respectively, wherein the first device is caused to train the data processing model by iteratively performing the following:
recovering the second channel information using the data processing model;
comparing the recovered second channel information with the first channel information by applying a loss function, where in the loss function is a Mean Squared Error (MSE) of a channel estimation; and
updating the data processing model based on the comparison, until a difference between the recovered second channel information and the first channel information being less than a threshold value;
determining a compensation parameter based on a first frequency of the uplink channel and a second frequency of the downlink channel;

compensating a phase of the received reference signal based on the compensation parameter;

transmitting a further reference signal on the downlink channel to the second device;

receiving from the second device a feedback to the further reference signal, the feedback comprising extracted channel information on the downlink channel; and recovering the extracted channel information on the downlink channel from the feedback using the data processing model.

\* \* \* \* \*